United States Patent
Kutscher et al.

(10) Patent No.: US 9,533,641 B2
(45) Date of Patent: Jan. 3, 2017

(54) TUBULAR BEAM OF AN AUTOMOTIVE STRUCTURE HAVING AN IMPROVED IMPACT BEHAVIOR

(75) Inventors: Matthias Kutscher, Rielasingen (DE); Martin Feuerstein, Singen (DE); Olivier Rebuffet, Grenoble (FR)

(73) Assignee: CONSTELLIUM SINGEN GMBH, Singen (DE)

( * ) Notice: Subject to any disclaimer, the term of this patent is extended or adjusted under 35 U.S.C. 154(b) by 617 days.

(21) Appl. No.: 13/981,143

(22) PCT Filed: Jan. 12, 2012

(86) PCT No.: PCT/EP2012/000110
§ 371 (c)(1),
(2), (4) Date: Aug. 22, 2013

(87) PCT Pub. No.: WO2012/100909
PCT Pub. Date: Aug. 2, 2012

(65) Prior Publication Data
US 2014/0049059 A1    Feb. 20, 2014

(30) Foreign Application Priority Data
Jan. 24, 2011    (EP) .................................... 11000526

(51) Int. Cl.
*B60R 19/18*    (2006.01)
*B60R 19/02*    (2006.01)
*B60R 19/03*    (2006.01)

(52) U.S. Cl.
CPC ................ *B60R 19/18* (2013.01); *B60R 19/02* (2013.01); *B60R 19/023* (2013.01); *B60R 19/03* (2013.01); *B60R 2019/182* (2013.01)

(58) Field of Classification Search
CPC ........ B60R 19/18; B60R 19/023; B60R 19/02; B60R 19/03; B60R 2019/182
(Continued)

(56) References Cited

U.S. PATENT DOCUMENTS 5,462,325 A    10/1995    Masuda et al.
6,000,738 A    12/1999    Stewart et al.
(Continued)

FOREIGN PATENT DOCUMENTS

DE    10150624 A1    4/2003

OTHER PUBLICATIONS

International Search Report and Written Opinion mailed May 7, 2012, corresponding to International Application No. PCT/EP2012/000110.

*Primary Examiner* — Joseph D Pape
*Assistant Examiner* — Dana Ivey
(74) *Attorney, Agent, or Firm* — Ladas & Parry LLP

(57) ABSTRACT

Bumper crossbeam (10, 10'), having a plane of symmetry (Y) and globally oriented in a direction (T) perpendicular to the plane of symmetry (Y), comprising two attachment areas (12a, 12b) symmetrically arranged with respect to the plane of symmetry (Y) and distant from each other by a distance D, said beam being designed to absorb the energy dissipated by a shock generated by a force substantially horizontal and oriented in a direction (L) perpendicular to said direction (T), made from a globally tubular body (11) with a monotonically varying nominal cross-section (Sn) over most of its length between said attachment areas (12a, 12b), except in two weakened areas (15a, 15b), which are symmetrical with respect to the plane of symmetry (Y), which are remote from the said plane of symmetry by a distance of between 0.10*D and 0.40*D, wherein the second moment of area about the axis (Z) perpendicular to the plane (L, T) is lower in the said weakened areas than expected from the nominal cross-section.

18 Claims, 2 Drawing Sheets

(58) Field of Classification Search
USPC .... 293/102, 120, 151, 154, 155; 296/203.02
See application file for complete search history.

(56) References Cited

U.S. PATENT DOCUMENTS 6,209,934 B1 * 4/2001 Sakuma .................. B60R 19/18
293/120
2001/0017473 A1 8/2001 Yamamoto

* cited by examiner $$I_z = \iint_S x^2 dx dz$$

TUBULAR BEAM OF AN AUTOMOTIVE STRUCTURE HAVING AN IMPROVED IMPACT BEHAVIOR

This application is a 371 of PCT/EP2012/000110, filed on Jan. 12, 2012, which claims priority to European Application No. EP 11000526.1, filed Jan. 24, 2011.

The invention relates to automotive structural components designed to irreversibly absorb impact energy. The related field differs from that of energy absorber elements— sometimes referred to as "deformation elements" or "crashboxes"—in the sense that said components, upon impact, do not primarily undergo stress in compression, but mainly in flexion. The invention relates more particularly to bumper cross beams.

Until the mid-90s, beams designed to irreversibly absorb energy upon impact, in particular bumper cross beams were made from shaped metallic sheets, generally made of steel. More and more stringent requirements from automobile manufacturers led to the insertion of deformable intermediate elements between the beams and the longitudinal vehicle supports which are called "absorbers", "crash boxes" or "deformation elements".

The bumper beam must both deform elastically during weak shocks, and partially absorb strong impact energy through plastic deformation and transmit under control the rest to absorbers and longitudinal supports, especially without abruptly collapsing during deformation. To comply with such a requirement, multicellular tubular beams are frequently used, which are extruded from aluminum blocks or manufactured from steel or aluminum sheets. Their main value lies in that they have and keep high inertia during the impact, and in that said inertia, particularly in the case of bumper beams, performs a structural strengthening role for as long as possible, especially in front of the vehicle. For example, U.S. Pat. No. 5,340,178 claims the use of a beam of this type in place of conventional open beams, usually made of high yield stress steel. In U.S. Pat. No. 5,727,826 a multicellular tubular beam is disclosed having a structure which makes it possible to both absorb shocks and withstand sudden collapse following impact. The same trend is observed for other structural beams such as, but not limited to, side door reinforcements, A-front or B-middle pillars, door sill rails, anti-intrusion rails, etc. U.S. Pat. No. 6,000,738 describes also a hollow multicellular tubular bumper beam, where the outer and inner walls are provided with aligned openings adapted to conduct air to the vehicle radiator.

Because of its section, the tubular beam has a high capacity to absorb deformation energy in the impact area but retains its original form in other areas. However, as for beams subjected to bending such as bumper beams, large displacements which may occur during a shock must also be prevented. Generally, bumper beams are attached to supports remote from each other, such as crash boxes, and located in continuation of the longitudinal frame members. In such a spatial configuration, central buckling may occur on the bumper beam, for example a fold may be formed in the middle of the beam, with a significant risk of intrusion of the deformed beam into a functional part of the vehicle, especially the cooling system of the said vehicle, and more particularly the radiator, which is generally substantially perpendicular to the plane of symmetry of the vehicle.

To prevent such central buckling, several solutions have been proposed. Patent application KR 2002 0080875 describes a beam stiffened in its central part with a stiffer additional piece. Patent application FR 2 876 646 also describes a car structure beam comprising a tubular body internally stiffened over all or part of its length by a natural or synthetic material, having a cell structure such as wood, the cell axis being substantially perpendicular to the longitudinal axis of the beam. Such solutions, particularly the first one, have the disadvantage of appreciably increasing the bumper weight, which goes against current trends in the market, which penalizes any solution leading to additional consumption of energy.

U.S. Pat. No. 5,462,325 describes a bumper beam, which comprises stiffened lateral areas where parallel beads are formed to improve its buckling strength.

The purpose of the present invention is to develop a new crossbeam structure, which makes it possible to avoid the drawbacks mentioned above while it still fulfils the functions originally defined, i.e. it has a high ability to absorb impact energy by local plastic deformation and to remain unstrained outside the impacted area.

Before describing the features of the first subject of the invention, we would like to describe in more detail the general shape of the bumper crossbeams which are concerned with the present invention. Bumper crossbeams are substantially symmetrical with respect to the plane of symmetry (Y) of the vehicle and are globally oriented in a direction (T) perpendicular to the plane of symmetry (Y). They are called "substantially symmetrical" or "globally symmetrical", because, usually, they are never fully symmetrical. For example, there is almost systematically a towing function on the right side of the bumper, which does not appear on the left side. The bumpers are designed to absorb the energy dissipated by a shock generated by a substantially horizontal (distributed or concentrated) force, oriented in a direction (L) substantially perpendicular to said direction (T). Generally, they comprise two attachment areas designed to be connected to two supporting parts of the automotive structure, symmetrically arranged with respect to the plane of symmetry (Y) of the vehicle and distant from each other by a distance D. Bumper crossbeams concerned with the present invention are made from a globally tubular body, typically an aluminum alloy extrusion, which is then generally shaped and machined such that the cross section ($S_n$) of the said crossbeam varies progressively, i.e. according to a monotonic function of the distance (d) to the plane of symmetry (Y), over most of its length between said attachment areas.

A first object of the invention is to provide a bumper crossbeam which is substantially symmetrical with respect to a plane of symmetry (Y) and globally oriented in a direction (T) perpendicular to the plane of symmetry (Y), which comprises two attachment areas designed to be connected to two supporting parts of the automotive structure, symmetrically arranged with respect to the plane of symmetry (Y) and distant from each other by a distance D, the nominal cross section ($S_n$) of which varies according to a monotonic function of the distance (d) to the plane of symmetry (Y) over most of its length between said attachment areas, characterised in that said crossbeam comprises two areas, called "weakened areas", symmetrically arranged with respect to the plane of symmetry (Y), remote from said plane of symmetry by a distance ($d_w$) of between 0.10*D and 0.40*D, preferably between 0.15*D and 0.35*D, more preferably between 0.20*D and 0.30*D, in which the cross section ($S_w$) is different from the nominal cross section ($S_n$) such that the second moment of area about the axis (Z) perpendicular to the plane (L, T) is lower in said weakened areas than the second moment of area of the corresponding nominal cross section. Typically, the most distorted part of the weakened area has a cross section with a second moment of area about axis (Z) less than 90%, preferably 80%, more preferably 70% compared to the second moment of inertia about axis (Z) of the nominal section, as expected from the monotonic function.

The crossbeam according to the invention is globally oriented in a direction (T) perpendicular to its plane of symmetry (Y). It is located in the automotive structure such that it is perpendicular to the substantially horizontal direction (L) of the force(s) which is (are) expected in the case of shock with an obstacle. Depending on the geometry of the crossbeam and of the obstacle, the expected force(s) may be applied concentrated in a local point of the beam or it (they) may be distributed along a part of the beam, oriented substantially horizontally and in a direction (L), which is perpendicular to the beam global direction (T), and, in the case of bumpers, coincides approximately with the direction of travel.

The beam is said to be "globally oriented in a direction (T)" because it is generally not straight. In the case of bumpers, the crossbeam is generally slightly bent, having a front wall (or compression wall) curved outwards and a rear wall (or tension wall) curved inwards. The impact force(s) is (are) substantially horizontal and oriented in the direction (L) perpendicular to said direction (T), such that the beam is essentially submitted to bending stresses during the impact, the front wall being near a zone under compressive stress and the rear wall being near a zone under tensile stress during the impact.

According to the invention, the bumper crossbeam is made from a globally tubular body, preferably an extruded tubular profile made of aluminum alloy, having a constant or, more generally, progressively varying cross section over most of its length between the attachment areas, except in the weakened areas. The nominal cross section ($S_n$) is the cross section which varies progressively, i.e. according to a monotonic function of the distance (d) to the plane of symmetry (Y), in the majority of the beam. The function may be a monotonically increasing function of d or a monotonically decreasing function of d. It may be a linear function of d. In the weakened areas, the cross section ($S_w$) does not follow this monotonic function and becomes significantly different from the nominal cross section ($S_n$), except near the borders with the rest of the crossbeam.

The progressive variation of the nominal cross section along the crossbeam may be related to the shape and/or to the thickness of the said crossbeam. If the variation is related only to the thickness, the latter may be defined using polar coordinates $t=f(\theta)$, where function f depends on distance d. If the variation is related only to the shape, we may symbolise it by the external contour of the cross section, which can be represented with polar coordinates by $\rho=g(\theta)$, where function g depends on distance d. In both cases, and consequently in all cases where the thickness and the shape vary together progressively along the crossbeam, the same axis orientation may be used for each cross section, for example by defining the horizontal axis oriented to the centre of the vehicle as the origin of the angular coordinate $\theta$, such that the thickness and the external contour of the cross section are represented, at distance d, by functions $h(d,\theta)$ and $k(d,\theta)$ respectively, which should be monotonic functions of d.

In the weakened area, the variation of the cross section follows another function, which is a non-monotonic, but preferably continuous function, smooth enough to prevent a sudden shearing of the beam in the transition zone and to make possible the plastic deformation of the beam in the weakened area, but steep enough so that the weakened areas may play a trigger role, i.e. so that a buckling, if any, initiates therein. The biggest difference between the nominal section $S_n$ and the section $S_w$ in the weakened area is located at a point which is distant by $d_w$ from the plane of symmetry (Y) and corresponds approximately to the middle of the weakened area.

The shape of the cross section in the weakened areas is different from the shape of the nominal cross section such that the second moment of area (also called "second moment of inertia") about the axis which passes through the centre of gravity of the said cross section and which is parallel to the bending moment vector is smaller in these weakened areas than expected is the rest of the beam. An example is illustrated on FIG. 2: a beam (100) is submitted to a bending moment represented by bending moment vector $\overline{M}$, which is parallel to vertical axis (Z), which is perpendicular to the ((T), (L)) plane. The second moment of area of its cross section about the axis passing through the centre of gravity G and parallel to direction (Z) of the bending moment vector is given by the formula:

$$I_Z = \iint x^2 dx dz.$$

Preferably, the most distorted part of the weakened area has a cross section $S_{wmd}$ with a second moment of area about axis (Z) less than 90%, preferably 80%, more preferably 70% compared to the second moment of inertia about axis (Z) of the nominal section $S_n$, as expected from the monotonic function.

To obtain a smaller second moment of area in the said weakened areas, the shape of the cross section may be modified in different ways, for example:
- by decreasing the thickness of the walls, preferably the front and/or the rear wall.
- by perforating holes in the walls, preferably on or near the front and/or the rear wall;
- by shaping the cross section of the beam by plastic deformation in such a manner that the front wall and/or the rear wall is (are) located closer to the axis (Z).

The preferred ways are characterized by the fact that the geometry of the front and/or rear walls of the beam is modified to decrease the second moment of area of the cross section. Moreover, by thinning the front and/or rear wall, e.g. by machining or by bringing it (them) closer to the centre of gravity (more precisely to the neutral axis in the case of bending), the variation of the cross section in the weakened area is less sudden than for example by perforating holes and prevents sudden shearing of the beam in the transition zone. In other words, preferred embodiments of the invention comprise a globally tubular shaped body having rear and front walls which are not perforated in the weakened areas. Advantageously, the section of the said globally tubular shaped body comprises either rear and/or front wall(s) which is (are) in the weakened areas thinner and/or closer to the centre of gravity than in the nominal cross section Sn.

The way of bringing the rear and/or front wall(s) closer to the neutral axis, i.e. the way of locally shaping the crossbeam by plastic deformation is preferred since the manufacturing process is simple and does not necessitate any machining of the beam, thus avoids any chip evacuation of the workstation.

In preferred embodiments, the tubular body, advantageously made from an aluminum extruded profile, comprises a substantially vertical front wall and a substantially vertical rear wall, spaced from each other by a distance l and interconnected by at least an upper wall and a lower wall.

The weakened areas are formed by machining and/or, preferably, by making a local plastic deformation of the front wall and/or of the rear wall, such that the said front wall and/or rear wall has (have) a recess. In the latter case, the largest size of the recess is preferably oriented vertically. In one of these preferred embodiments, the front and/or rear wall(s) is (are) locally plastically shaped such that the maximum depth of the recess is on the top or on the bottom of the front and/or rear wall(s). In another embodiment, the front and/or rear wall(s) is (are) plastically deformed along its (their) whole height, resulting in an oblong or cylindrical recess.

Another object of the invention is to provide a manufacturing process for an automotive structure beam, for example a bumper beam. This manufacturing process includes the following steps:
a) providing an extruded aluminum alloy profile comprising a substantially vertical front wall and a substantially vertical rear wall, spaced from each other by a distance d and interconnected by at least an upper wall and a lower wall;
b) shaping it, for example by bending, to obtain the global shape of the automotive structure beam which has a constant cross section between the attachment areas designed to be connected to the supporting parts of the automotive structure;
c) shaping locally the front (resp. rear) wall of said profile to obtain a recess(es) in said weakened areas.

The shaping operation of step c) is for example obtained by applying locally on the front (resp. rear) wall of the profile a punch actuated by a hydraulic cylinder. The punch is actuated such that it pushes the front (resp. rear) wall towards the centre of the profile over a distance $\Delta X$, thus creating a recess. In order to obtain a continuous and slight variation of the cross section in the weakened area to prevent sudden shearing of the beam in the transition zone, the punch has a curved working surface, with a radius of curvature close to the distance l, typically between 0.5*l and 2*l. The distance of travel $\Delta X$ is between 0.05*l and 0.2*l, typically close to 0.1*l, at the level of the most distorted part of the weakened area. The punch may be an inclined, slightly sloping vertical plane (T, Z), such that the first contact with the front (resp. rear) wall is located at the top or the bottom of the said wall. In another embodiment, the punch has a vertical working surface such that the front (resp. rear) wall is plastically deformed along its whole height.

Advantageously, the weakened areas are also locally heat-treated so as to provide instant mechanical properties equal to or, preferably, lower than the rest of the beam. It may be helpful in the case where the said weakened areas are shaped by plastic deformation and consequently strain hardened.

Figure 1:
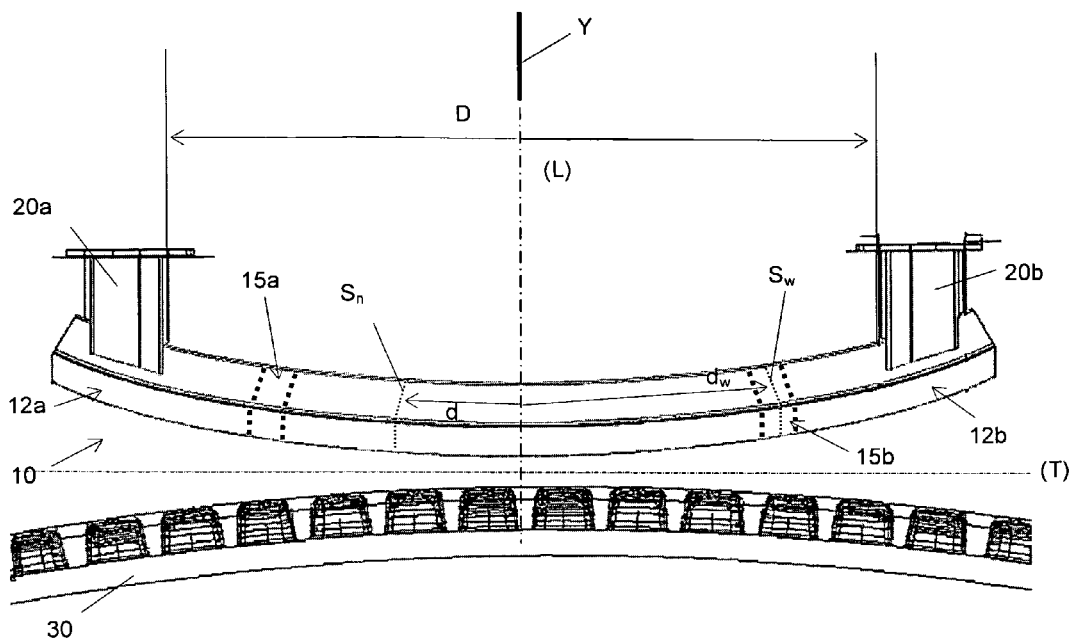
FIG. 1 illustrates schematically the top view of a bumper beam according to the invention.
Figure 2:
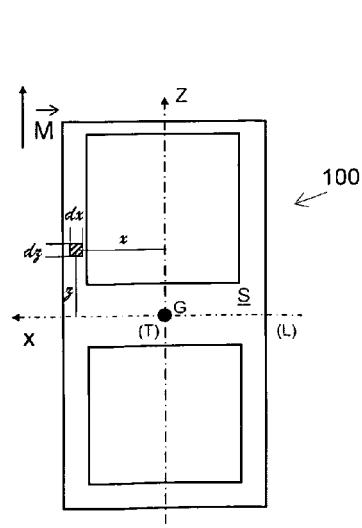
FIG. 2 illustrates schematically on the cross section of a beam the definition of the second moment of area about an axis.

FIG. 1 illustrates a bumper crossbeam (10) according to the invention, which is globally symmetrical with respect to a plane of symmetry (Y) and is globally oriented in a direction (T) perpendicular to the plane of symmetry (Y). It comprises two attachment areas (12a, 12b) designed to be connected to two supporting parts (20a, 20b) of the automotive structure. The attachment areas are symmetrically arranged with respect to the plane of symmetry (Y) and are distant from each other by a distance D. Said beam may suddenly contact an obstacle, here illustrated by a barrier (30). The shock generates substantially horizontal forces and oriented in the direction of travel (L) substantially perpendicular to said direction (T).

The bumper crossbeam (10) is made from an extruded tubular profile in aluminum alloy which has been slightly bent, with a front wall (or compression wall) curved outwards and a rear wall (or tension wall) curved inwards. Generally the crossbeam is shaped such that its width l decreases from the plane of symmetry (Y) to the attachment areas (12a, 12b), even often as far as the ends. Here, for purposes of simplification, the cross section $S_n$ is substantially constant over most of the length of the crossbeam between the attachment areas (12a, 12b). The bumper crossbeam (10) comprises also weakened areas (15a, 15b), which are symmetrically arranged with respect to the plane of symmetry (Y) and are remote from said plane of symmetry by a distance $d_w$ of 0.25*D. In the weakened areas, the cross section $(S_w)$ is different from the nominal cross section $(S_n)$, its shape being such that the second moment of area $I_Z$ about the axis (Z) perpendicular to the plane (L, T) is lower in said weakened areas than the second moment of area corresponding to the nominal cross section $S_n$.

PARTICULAR EMBODIMENTS OF THE INVENTION

Example 1

Figure 3:
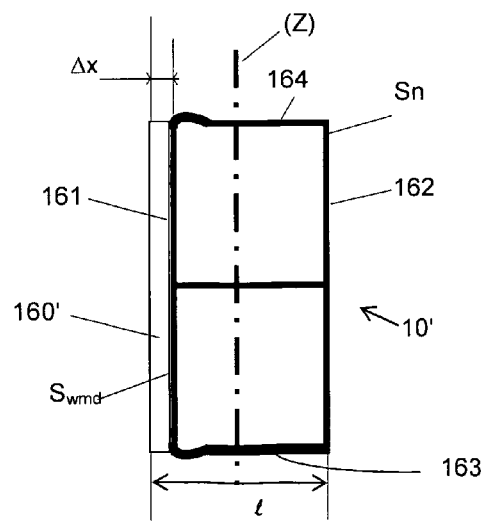
FIG. 3 illustrates, in a section along a plane passing through the minimum cross section, a first embodiment of the invention.
Figure 4:
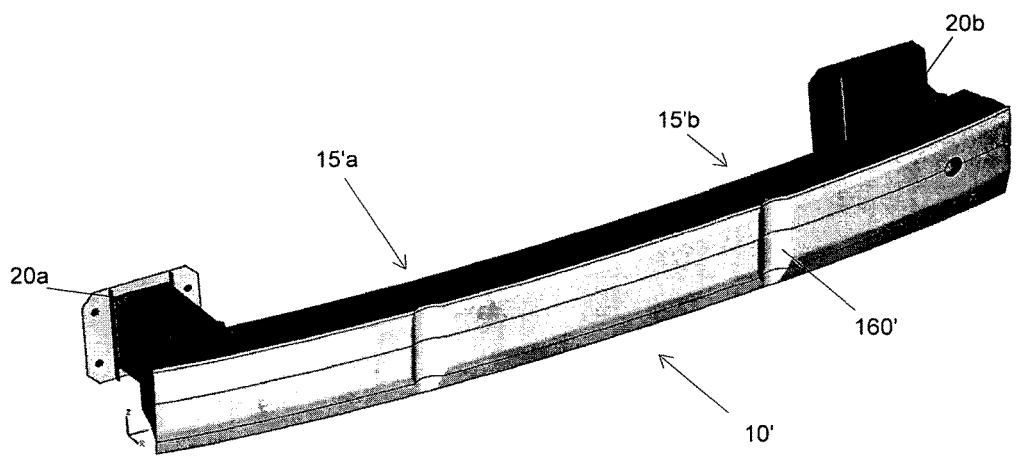
FIG. 4 illustrates, in perspective, the embodiment of FIG. 3.
Figure 5:
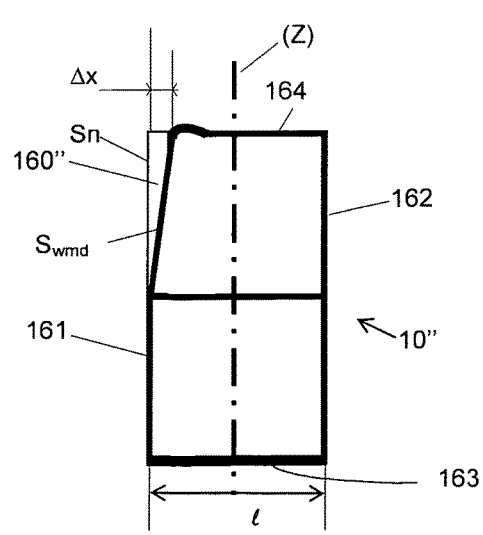
FIG. 5 illustrates schematically the cross section of a second embodiment of the invention.

FIGS. 3 and 4, Variant on FIG. 5

FIGS. 3 and 4 illustrate a first embodiment of the invention, where the bumper crossbeam (10') is made from an extruded aluminum alloy profile which has been bent to have the expected global shape of the bumper and where the weakened areas have been made by plastic deformation of the front wall of the crossbeam. The cross section of the profile comprises a front wall (161), a rear wall (162), a top wall (164) and a bottom wall (162).

In the weakened areas (15'a and 15'b), the front wall (161) is pushed towards the bumper, by applying a punch on the entire height of the said front wall and actuating said punch such that it goes towards the profile over a distance $\Delta X$, thus creating a recess (160'). In order to obtain a continuous and slight variation of the cross section in the weakened area to prevent sudden shearing of the beam in the transition zone, the indenter has a curved working surface, with a radius of curvature close to the distance l between the front wall and the rear wall. The distance of travel $\Delta X$ is approximately one-tenth of l at the level of the most distorted part of the weakened area. The recess (160') is substantially cylindrical, oriented along axis (Z) and extends over the entire surface of the front wall.

FIG. 5 illustrates an example similar to the preceding one, where the bumper crossbeam (10") is made from an extruded hollow profile, which has been bent then locally shaped by a punch which is inclined such that, when actuated to move towards the profile, it comes in contact with the top of the front wall. The maximum depth of the recess (160") is consequently located at the top of the front wall of the crossbeam.

Example 2

FIG. 6

Figure 6:
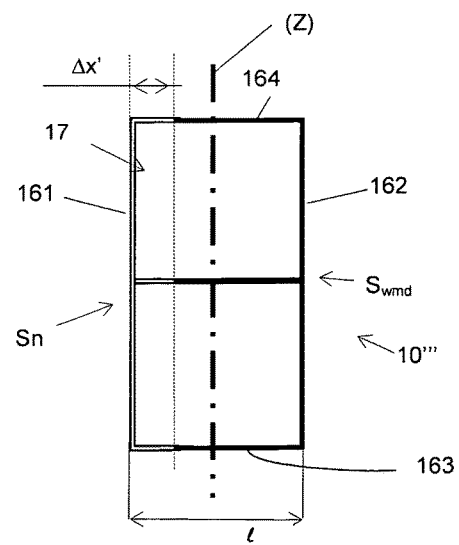
FIG. 6 illustrates the cross section of a third embodiment of the invention.

FIG. 6 illustrates another embodiment of the invention, where the bumper crossbeam (10''') is made from an extruded aluminum alloy profile which has been bent to have the expected global shape of the bumper and where the weakened areas have been made by machining of a front portion of the crossbeam, which includes the front wall and portions of the top wall and the bottom wall adjacent to the front wall. The geometry of the machined surface follows the cradle-type shape of the recess of the first embodiment, with the difference that there is no more front wall (161) in the weakened area, such that the recess (160) is replaced with a cavity (17) communicating with the interior of the hollow profile.

Depending on the vehicle to be equipped with a bumper, the crossbeam of the bumper is bent with one or more radii of curvature and the distance D between the attachment areas (12a, 12b) is roughly between 1000 mm and 2000 mm. The weakened zones are generally located between 150 mm and 500 mm from the plane of symmetry (Y) of the vehicle. Thanks to the invention, the buckling distance of travel of the middle part of the bumper can be typically reduced from 100 mm to 80 mm. If the critical buckling distance of travel (for example 100 mm) can be kept, the initial thickness of the section from which the bumper is made can be reduced, typically by 3 to 2.5 mm, such that the bumper has a lower weight.

The invention claimed is:

1. A vehicle bumper comprising:
   a crossbeam having a tubular body, a nominal cross section $S_n$, a first end, and a second end;
   wherein said crossbeam is substantially symmetrical with respect to a plane of symmetry Y, and globally oriented in a direction T that is perpendicular to the plane of symmetry Y;
   wherein said crossbeam is configured to absorb the energy dissipated by a shock generated by a concentrated or substantially horizontal distributed force oriented in a direction L perpendicular to said direction T;
   first and second attachment areas on the crossbeam, said first and second attachment areas being configured to attach the crossbeam to the vehicle;
   wherein the first and second attachment areas are symmetrically arranged with respect to the plane of symmetry Y of the crossbeam;
   wherein said first and said second attachment areas are separated by a distance D;
   wherein the nominal cross section $S_n$ of said crossbeam varies progressively according to a monotonic function of the distance d to the plane of symmetry Y over most of a length of the crossbeam and between said first and second attachment areas;
   first and second weakened areas in the crossbeam, said first and second weakened areas both having a cross section $S_w$;
   wherein said first and second weakened areas are arranged symmetrically with respect to the plane of symmetry Y of the crossbeam;
   wherein a distance $d_w$ of the first and second weakened areas from the plane of symmetry is between 0.10*D and 0.40*D;
   wherein the nominal cross section $S_n$ of the crossbeam is different from the cross section $S_w$ of the first and second weakened areas; and
   wherein a second moment of area about an axis Z, perpendicular to a plane defined by L and T, is lower in said first and second weakened areas than a second moment of area of the nominal cross section $S_n$;
   wherein said first attachment area is located between said first weakened area and said first end of said crossbeam; and
   wherein said second attachment area is located between said second weakened area and said second end of said crossbeam.

2. The vehicle bumper according to claim 1, wherein the distance $d_w$ is between 0.15*D and 0.35*D.

3. The vehicle bumper according to claim 1, wherein the distance $d_w$ is 0.20*D and 0.30*D.

4. The vehicle bumper according to claim 1, wherein the cross section $S_w$ of said first and second weakened areas varies progressively according to a non-monotonic, continuous function that is smooth enough to prevent sudden shearing of the crossbeam in a transition zone, and to make possible a plastic deformation of the crossbeam in the first and second weakened areas, but steep enough so that the first and second weakened areas may play a trigger role, so that any buckling initiates in the first and second weakened areas.

5. The vehicle bumper according to claim 1, wherein a most distorted portion of the first and second weakened areas has a cross section $S_{wmd}$ with a second moment of area about axis Z of less than 90%, compared to the second moment of inertia about axis Z of the nominal cross section $S_n$, as expected from the monotonic function.

6. The vehicle bumper according to claim 5, wherein the second moment of area about axis Z is 80%.

7. The vehicle bumper according to claim 5, wherein the second moment of area about axis Z is 70%.

8. The vehicle bumper according to claim 1, wherein said first and second weakened areas each comprise unperforated front and rear walls.

9. The vehicle bumper according to claim 1, wherein the cross section $S_w$ of each of the first and second weakened areas comprises at least one of a front wall and a rear wall that is at least one of thinner and closer to a center of gravity than in the nominal cross section $S_n$.

10. The vehicle bumper according to claim 1, wherein the crossbeam comprises:
    a substantially vertical front wall and a substantially vertical rear wall, and an upper wall and a lower wall connecting said vertical front wall and said vertical rear wall;
    wherein a distance between said vertical front wall and said vertical rear wall is a distance l; and
    a recess is provided in at least one of said front wall and said rear wall of said first and second weakened areas.

11. The vehicle bumper according to claim 10, wherein said recess has a depth of between 0.05*l and 0.2*l.

12. The vehicle bumper according to claim 11, wherein said depth is about 0.1*l.

13. The vehicle bumper according to claim 10, wherein a largest size of said recess is oriented vertically.

14. The vehicle bumper according to claim 10, wherein said recess is substantially cylindrical, is oriented along axis Z, and extends over an entire surface of at least one of said front wall and said rear wall.

15. The vehicle bumper according to claim 10, wherein at least one of the front wall and the rear wall is plastically shaped, such that a maximum depth of the recess is on the top or on the bottom of at least one of the front wall and the rear wall.

16. The vehicle bumper according to claim 1, wherein said crossbeam comprises:
- a substantially vertical front wall and a substantially vertical rear wall, and an upper wall and a lower wall connecting said vertical front wall and said vertical rear wall;
- wherein a distance between said vertical front wall and said vertical rear wall is a distance l; and
- wherein at least one of said upper wall and said lower wall comprises a plurality of perforations.

17. The vehicle bumper according to claim 1, wherein said crossbeam comprises:
- a substantially vertical front wall and a substantially vertical rear wall, and an upper wall and a lower wall connecting said vertical front wall and said vertical rear wall;
- wherein said first and second weakened areas are manufactured by machining a portion of a profile which includes said front wall and portions of said upper wall and the said lower wall adjacent to said front wall, the machined portion having a cradle-type shape and delimiting a cavity which communicates with an interior of the profile.

18. The vehicle bumper according to claim 1, comprising first and second weakened areas that have been heat-treated.

* * * * *